United States Patent
Shin et al.

(10) Patent No.: US 11,545,711 B2
(45) Date of Patent: Jan. 3, 2023

(54) BATTERY MODULE INCLUDING UNIT BODY

(71) Applicant: LG Chem, Ltd., Seoul (KR)

(72) Inventors: Eun-Gyu Shin, Daejeon (KR); Jeong-O Mun, Daejeon (KR)

(73) Assignee: LG Energy Solution, Ltd.

( * ) Notice: Subject to any disclaimer, the term of this patent is extended or adjusted under 35 U.S.C. 154(b) by 210 days.

(21) Appl. No.: 16/439,808

(22) Filed: Jun. 13, 2019

(65) Prior Publication Data

US 2020/0006726 A1    Jan. 2, 2020

(30) Foreign Application Priority Data

Jun. 29, 2018   (KR) .................. 10-2018-0075761

(51) Int. Cl.
*H01M 50/20*   (2021.01)
*H01M 10/613*   (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC ............ H01M 2/1077; H01M 10/653; H01M 2/1094; H01M 220/20; H01M 10/60–625; H01M 2220/20; H01M 50/20–24
(Continued)

(56) References Cited

U.S. PATENT DOCUMENTS

| 10,205,153 B2 | 2/2019 | Yang et al. |
| 2015/0072205 A1* | 3/2015 | Jung .............. H01M 50/116 429/94 |
| 2018/0269548 A1 | 9/2018 | Chi et al. |

FOREIGN PATENT DOCUMENTS

| JP | 2002198099 A | 7/2002 |
| KR | 20130017129 A | 2/2013 |

(Continued)

OTHER PUBLICATIONS

EPO machine translation of KR20130017129 originally published to Kim Bo Hyun on Feb. 20, 2013 (Year: 2013).*

(Continued)

*Primary Examiner* — Jonathan G Jelsma
*Assistant Examiner* — Niara Trant
(74) *Attorney, Agent, or Firm* — Lerner, David, Littenberg, Krumholz & Mentlik, LLP

(57) ABSTRACT

Provided is a battery module in which a heat radiation effect and manufacturing efficiency are effectively improved. The battery module includes a cell assembly including at least one unit body, each unit body including at least two secondary batteries stacked in a first direction. Each unit body includes an integrated unit sheet folded to surround a top portion, a left surface, a right surface, and a bottom portion of the at least two secondary batteries, opposite ends of a top portion of the integrated unit sheet being positioned to contact each other on any one of the top portion, the left surface, the right surface, and the bottom portion of the at least two secondary batteries, and an electric insulating material coated on at least a part of a perimeter portion of the integrated unit sheet.

11 Claims, 8 Drawing Sheets

(51) Int. Cl.
H01M 10/625 (2014.01)
H01M 10/653 (2014.01)
H01M 50/24 (2021.01)

(52) U.S. Cl.
CPC ......... H01M 10/653 (2015.04); H01M 50/24 (2021.01); *H01M 2220/20* (2013.01)

(58) Field of Classification Search
USPC .......................................................... 429/153
See application file for complete search history.

(56) References Cited

FOREIGN PATENT DOCUMENTS

| | | |
|---|---|---|
| KR | 101307985 B1 | 9/2013 |
| KR | 101400083 B1 | 5/2014 |
| KR | 20150111160 A | 10/2015 |
| KR | 20160131360 A | 11/2016 |
| KR | 20170067012 A | 6/2017 |
| KR | 20170140693 A | 12/2017 |
| KR | 20180005456 A | 1/2018 |

OTHER PUBLICATIONS

EPO machine translation of KR20180005456 originally published to Lee Bok Gun on Jun. 16, 2018 (Year: 2018).*

* cited by examiner

BATTERY MODULE INCLUDING UNIT BODY

CROSS-REFERENCE TO RELATED APPLICATIONS

The present application claims priority to Korean Patent Application No. 10-2018-0075761, filed on Jun. 29, 2018 in the Republic of Korea, the disclosure of which is hereby incorporated herein by reference.

TECHNICAL FIELD

The present disclosure relates to a battery module including a unit body, and more particularly, to a battery module in which heat radiation efficiency and manufacturing efficiency are effectively improved.

BACKGROUND ART

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such secondary batteries are applicable to various product groups and have electric characteristics of high energy density. Such secondary batteries are applied not only to portable electronic devices, but also to electric vehicles or hybrid vehicles driven by electric power sources, power storage apparatuses, etc.

Such secondary batteries are receiving attention as a new energy source for enhancing environmental friendliness and energy efficiency in that the secondary batteries have primary advantage of drastically reducing the use of fossil fuel in addition to no by-product generated due to the use of energy.

A battery pack applied to an electric vehicle or the like has a structure in which a plurality of battery modules including a plurality of secondary batteries are connected to each other to obtain high output. Also, each secondary battery includes, as an electrode assembly, positive electrode and negative electrode current collectors, a separator, an active material, an electrolyte solution, etc. and thus is capable of being repeatedly charged and discharged according to an electrochemical reaction between components.

Meanwhile, as needs for a large-capacity structure in addition to utilization as an energy storage source have recently increased, demands for a plurality of battery modules in which a plurality of secondary batteries are connected in series and/or in parallel are increasing.

Since such a battery module is manufactured in such a manner that the plurality of secondary batteries are packed in a small space, it is important to easily discharge heat generated from each secondary battery to the outside.

In other words, in a process of charging or discharging the secondary battery, heat is generated by the electrochemical reaction. Accordingly, when heat of the battery module generated during charging and discharging processes is not effectively removed, heat accumulation may occur. Also, deterioration of the battery module is accelerated, and in some cases, ignition or an explosion may occur.

Also, when the plurality of secondary batteries are mounted inside one battery module, the density of the secondary batteries is rather very high due to spatial restriction. Also, since a heating value of the secondary battery is proportional to a square of a current, a temperature of the secondary battery is likely to rapidly increase during high-rate discharge. In particular, a heat island, in which heat is concentrated at an inner region (center region) of an arrangement structure of the secondary batteries mounted inside the battery module, easily occurs.

When such a heat island is continued for a long period of time, an output voltage of the secondary batteries electrically connected in a parallel structure is not uniform resulting in cell imbalance, and thus it is difficult for the battery module to exhibit its own performance. In this regard, a technique capable of improving heat balance is required to increase the performance and life characteristics of the battery module.

In addition, in the related art, a lot of time is consumed to stack or arrange the plurality of secondary batteries during processes of manufacturing the battery module. Also, since a pouch type secondary battery has a smooth outer surface, manufacture workability is low, for example, an operator may drop the secondary battery while stacking or arranging the plurality of secondary batteries or the arrangement of the stacked secondary batteries may be easily disrupted, and thus the manufacture efficiency may be decreased.

DISCLOSURE

Technical Problem

The present disclosure is designed to solve the problems of the related art, and in particular, the present disclosure is directed to providing a battery module in which heat radiation efficiency and manufacturing efficiency are effectively improved.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including a cell assembly including at least one unit body, each unit body comprising at least two secondary batteries stacked in a first direction.

Also, each unit body may include an integrated unit sheet that may be folded to surround a top portion, a left surface, a right surface, and a bottom portion of the at least two secondary batteries, opposite ends of a top portion of the integrated unit sheet may be positioned to contact each other on any one of the top portion, the left surface, the right surface, and the bottom portion of the at least two secondary batteries, and an electric insulating material may be coated on at least a part of a perimeter portion of the integrated unit sheet.

In addition, the electric insulating material may be coated on an inner surface of the integrated unit sheet, the inner surface contacting the at least two secondary batteries.

Moreover, the integrated unit sheet may be configured to surround an upper sealing portion provided at the top portion of the at least two secondary batteries, a lower sealing portion provided at the bottom portion of the at least two secondary batteries, and an accommodating portion of each of the at least two secondary batteries in which an electrode assembly and an electrolyte solution are accommodated.

Also, the integrated unit sheet may have an uneven structure having a shape corresponding to either of the upper sealing portion or the lower sealing portion of the at least two secondary batteries, or both of the upper sealing portion and the lower sealing portion of the at least two secondary batteries.

In addition, the lower sealing portion of the at least two secondary batteries may be positioned at a lower inner surface of the unit sheet, and the opposite ends of the top portion of the integrated unit sheet may be positioned on the upper sealing portion of the at least two secondary batteries.

Moreover, the integrated unit sheet may have an uneven structure at each of the opposite ends of the top portion of the integrated unit sheet.

Also, the opposite ends of the top portion of the integrated unit sheet may overlap each other, and each body unit may also include an adhesive member disposed on an overlapping portion of the opposite ends of the top portion of the integrated unit sheet.

Furthermore, a first one of the opposite ends of the top portion of the integrated unit sheet may have a first structure folded in an inward direction, a second one of the opposite ends of the top portion of the integrated unit sheet has a second structure folded in an outward direction, and folded inner surfaces of the first and second structures may face each other and together may form a hook locking structure.

Also, the battery module may further include a heat sink positioned at a bottom portion of the at least one unit body.

Moreover, a heat conductive glue or heat conductive pad may be disposed between the integrated unit sheet and the at least two secondary batteries of each unit body.

In another aspect of the present disclosure, there is also provided a battery pack including the at least one battery module according to the present disclosure.

In another aspect of the present disclosure, there is also provided a vehicle including the battery pack according to the present disclosure.

Advantageous Effects

According to an aspect of the present disclosure, in a battery module, damage to a pouch of a secondary battery caused by a unit sheet may be prevented by coating an electric insulating material on at least a part of a perimeter portion of the unit sheet. In addition, the electric insulating material coated on the unit sheet may adhere and fix the unit sheet to a surface of at least two secondary batteries, and thus the unit sheet may maintain a state of being closely adhered to the secondary battery.

Also, even when an inner metal layer of a pouch is externally exposed because a pouch exterior of a secondary battery is defective or damaged, the present disclosure may prevent the secondary battery from being short-circuited via a unit sheet owing to an electric insulating material entirely coated on an inner surface of the unit sheet.

Moreover, according to an aspect of the present disclosure, by providing, to a unit sheet, an uneven structure having a shape corresponding to a lower sealing portion or an upper sealing portion of a plurality of secondary batteries, not only an empty space is removed from the unit sheet, but also a contact area between the unit sheet and the secondary battery is increased, thereby maximizing a heat radiation effect of a cell assembly.

Also, according to an aspect of the present disclosure, since a unit body may be forcibly fitted by using a protrusion and an insertion hole provided respectively on both ends of a top portion of a unit sheet, the unit body is easily manufactured without having to use a separate locking member, and thus manufacturing costs may be reduced and manufacturing efficiency may be increased.

Also, according to another aspect of the present disclosure, by adding an adhesive member such that both ends of a top portion of a unit sheet, which are positioned at a top portion of a secondary battery, are locked to each other, a unit body may be easily and strongly manufactured.

Moreover, according to another aspect of the present disclosure, by providing an inward folded structure and an outward folded structure to both ends of a top portion a unit sheet, both ends of the top portion of the unit sheet may be bound to each other via a hook locking structure without having to use a separate locking member, and thus not only manufacturing costs of a battery module may be reduced, but also manufacturing efficiency may be increased.

Also, according to another aspect of the present disclosure, a battery module of the present disclosure includes a heat sink and heat conductive glue or a heat conductive pad, and thus heat generated in a secondary battery may be more effectively discharged to the outside.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
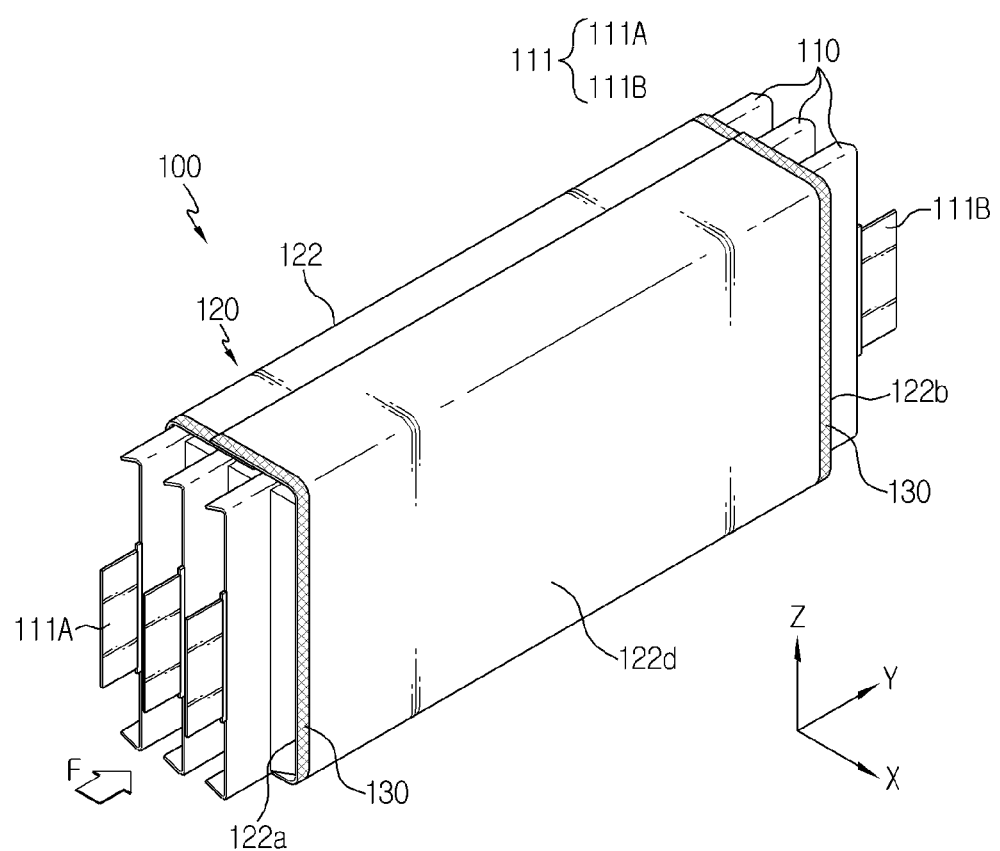
FIG. 1 is a perspective view schematically showing some components of a battery module, according to an embodiment of the present disclosure.
Figure 2:
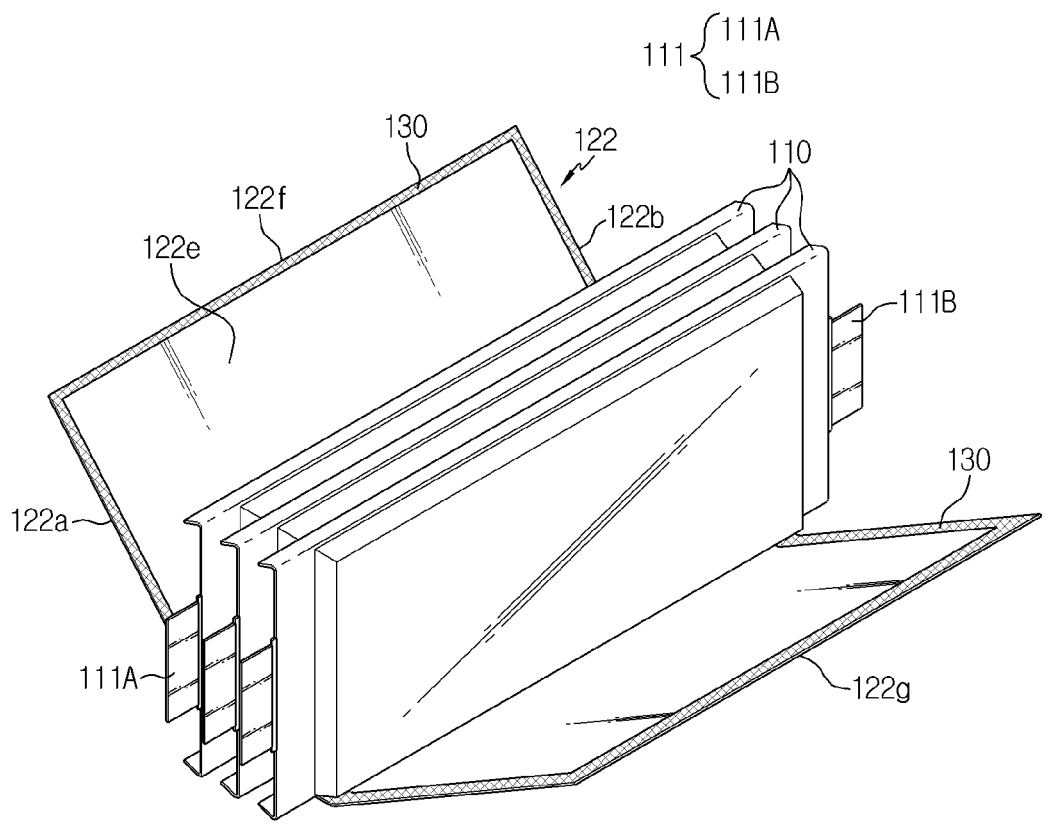
FIG. 2 is a perspective view schematically showing secondary batteries and a unit sheet before a unit body of a battery module is manufactured, according to an embodiment of the present disclosure.

FIG. 1 is a perspective view schematically showing some components of a battery module, according to an embodiment of the present disclosure. FIG. 2 is a perspective view schematically showing secondary batteries and a unit sheet before a unit body of a battery module is manufactured, according to an embodiment of the present disclosure. Also, FIG. 3 is a side view schematically showing a secondary battery that is a partial component of a battery module, according to an embodiment of the present disclosure.

Figure 3:
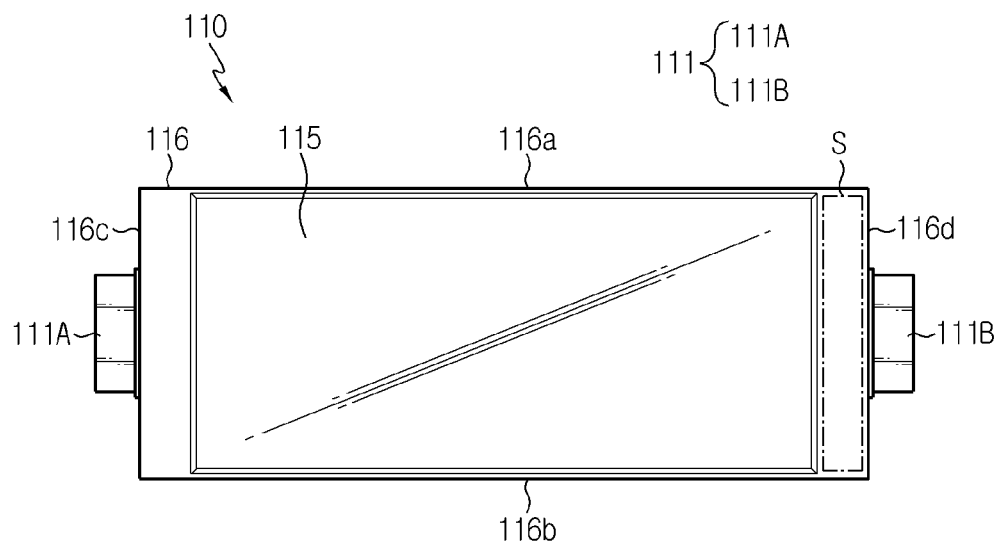
FIG. 3 is a side view schematically showing a secondary battery that is a partial component of a battery module, according to an embodiment of the present disclosure.

Referring to FIGS. 1 through 3, a battery module 200 of the present disclosure may include a cell assembly 100 including at least one unit body 120.

Here, the unit body 120 may include at least two secondary batteries 110 stacked in one direction. Also, the unit body 120 may be provided as the at least two secondary batteries 110 are bound and grouped by an integrated unit sheet 122.

Moreover, the secondary battery 110 may be a pouch type secondary battery 110. In particular, such a pouch type secondary battery 110 may include an electrode assembly, an electrolyte solution, and a pouch 116.

Here, the pouch 116 may be configured as a pouch where an accommodating portion 115 having a concave shape is formed. Also, the electrode assembly and the electrolyte solution may be accommodated in the accommodating portion 115. Also, the pouches 116 may each include an external insulating layer, a metal layer, and an internal adhesive layer, and the internal adhesive layers may be adhered to each other at edge portions of the pouches 116 such that upper and lower sealing portions 116a and 116b are formed. Moreover, a terrace portion S may be provided each at front and rear ends where a positive electrode lead 111A and a negative electrode lead 111B are formed.

Also, the electrode assembly is an assembly of an electrode and a separation film, and may be configured in a form in which at least one positive electrode plate and at least one negative electrode plate are arranged with the separation film therebetween. Also, a positive electrode tab is provided at the positive electrode plate of the electrode assembly, and at least one positive electrode tab may be connected to the positive electrode lead 111A.

Here, the positive electrode lead 111A may have one end connected to the positive electrode tab and the other end exposed to the outside of the pouch 116, and such an exposed portion may function as an electrode terminal of the secondary battery 110, for example, as a positive electrode terminal of the secondary battery 110.

Also, a negative electrode tab may be provided at the negative electrode plate of the electrode assembly, and at least one electrode tab may be connected to the negative electrode lead 111B. Also, the negative electrode lead 111B may have one end connected to the negative electrode tab and the other end exposed to the outside of the pouch 116, and such an exposed portion may function as an electrode terminal of the secondary battery 110, for example, as a negative electrode terminal of the secondary battery 110.

Moreover, as shown in FIG. 1, when viewed from a direction indicated by an arrow F, the positive electrode lead 111A and the negative electrode lead 111B may be provided at the front and rear ends in opposite directions (a front-and-back direction) based on the center of the secondary battery 110. In other words, the positive electrode lead 111A may be provided at one end (front end) based on the center of the secondary battery 110. Also, the negative electrode lead 111B may be provided at the other end (rear end) based on the center of the secondary battery 110.

For example, as shown in FIGS. 1 and 3, each secondary battery 110 of the cell assembly 100 may be configured such that the positive electrode lead 111A and the negative electrode lead 111B protrude forward and backward.

Here, the terms indicating directions, such as front, back, left, right, up, and down, may vary according to a position of an observer, how a target is placed, or the like. However, in the present specification, for convenience of description, front, back, left, right, up, and down directions are distinguished based on the direction indicated by the arrow F.

As such, according to such a configuration of the present disclosure, in one secondary battery 110, an area of an electrode lead 111 may be increased by removing interference between the positive electrode lead 111A and the negative electrode lead 111B.

Also, the positive electrode lead 111A and the negative electrode lead 111B may be configured in a plate shape. In particular, the positive electrode lead 111A and the negative electrode lead 111B may each protrude in a horizontal direction (Y-direction) while a wide area is erected to face a left side and a right side.

Also, the plurality of secondary batteries 110 may be included as one unit body 120, and may be stacked in at least one direction. For example, as shown in FIGS. 1 and 3, three pouch type secondary batteries 110 may be stacked on each other in parallel in a left-and-right direction (X-direction).

Here, when viewed from the direction indicated by the arrow F (shown in FIG. 1), each pouch type secondary battery 110 may be arranged to be perpendicularly erected (Z-direction) approximately on the ground such that two wide surfaces are respectively positioned at the left and the right and a sealing portion is positioned at top, bottom, front, and back portions. In other words, each secondary battery 110 may be erected in an up-and-down direction. Meanwhile, in the present specification, unless otherwise specified, up, down, front, back, left, and right directions are based on the direction indicated by the arrow F.

However, the battery module 200 according to the present disclosure may not only employ the pouch type secondary battery 110 described above, but also employ various secondary batteries 110 well-known at the time of application of the present disclosure.

Meanwhile, referring back to FIG. 1, the unit sheet 122 may include, for example, a metal material having excellent heat conduction. For example, the unit sheet 122 may include at least one of aluminum, copper, nickel, and steel.

However, the material of the unit sheet 122 is not limited only to a metal material, but may also include, for example, carbon nanotube, graphite, carbon fiber, or the like having excellent heat conduction.

Moreover, the unit sheet 122 may include copper having electric insulation or electric insulating plastic. That is, since such a material has insulation compared to the metal material, the unit sheet 122 is easily assembled and handled while manufacturing the unit body 120 by surrounding the plurality of secondary batteries 110.

Here, an electric insulating material 130 may be electric insulating polymer resin. For example, the polymer resin may be polysiloxane resin or epoxy.

Alternatively, the polymer resin may be hot-melt resin. The hot-melt resin is solvent free resin, and may be thermoplastic resin that is solid at a room temperature but is melted at a melting point or higher when heated, and then solidified via cooling to provide adhesion. For example, the thermoplastic resin may be at least one of polystyrene, polyvinyl chloride, acryl resin, polyethylene, polypropylene, and polyester.

Also, the unit sheet 122 may have a form in which a quadrangular plane sheet is folded a plurality of times. Moreover, the unit sheet 122 may be folded to surround a top portion, a left surface, a right surface, and a bottom portion of the at least two secondary batteries 110.

For example, as shown in FIG. 1, the unit body 120 may include three secondary batteries 110 and one unit sheet 122. Also, the unit sheet 122 may have a structure folded in an upward direction at both bottom sides to surround the top portion, the left surface, the right surface, and the bottom portion of the three secondary batteries 110, and may also have a structure folded in an inward direction at both top sides. Moreover, the unit sheet 122 may be positioned such as not to contact the positive electrode lead 111A and the negative electrode lead 111B of the secondary battery 122.

In particular, the unit sheet 122 may be configured such as to surround the upper sealing portion 116a provided at the top of the at least two secondary batteries 110, the lower sealing portion 116b provided at the bottom thereof, and the accommodating portion 115 where the electrode assembly and the electrolyte solution are accommodated.

As such, according to such a configuration of the present disclosure, the unit sheet 112 is configured to surround the accommodating portion 115 where heat generation of the secondary battery 110 is concentrated, thereby increasing a heat radiation effect of the cell assembly 100.

Also, both ends 122f and 122g of the top portion of the unit sheet 122 may be positioned to contact each other on one of the top portion, the left surface, the right surface, and the bottom portion of the secondary battery 110. Here, both ends may indicate regions provided at both ends of a top portion of a unit sheet in a stacked direction of secondary batteries.

For example, as shown in FIG. 1, both ends 122f and 122g of the top portion of the unit sheet 122 may be positioned to contact each other at the top portion of the secondary battery 110. Regions of both ends 122f and 122g of the top portion the unit sheet 122 may overlap each other.

Meanwhile, since a front end 122a provided at a perimeter portion of the unit sheet 122 has a sharp surface (corner), it is highly likely that the unit sheet 122 may damage a ductile pouch of the secondary battery 110 while surrounding the at least two secondary batteries 110, and thus there is a risk that a metal layer inside the pouch 116 may contact a conductive material, such as the unit sheet 122 or the like, to cause a short-circuit, according to the damage to the pouch 116 of the secondary battery 110.

Accordingly, the electric insulating material 130 may be coated on at least a part of the perimeter portion of the unit sheet 122 of the unit body 120 of the present disclosure.

In particular, among the perimeter portion of the unit sheet 122, the electric insulating material 130 may be coated only on end surfaces of the front end 122a and a rear end 122b in the front-and-back direction. Also, among the perimeter portion of the unit sheet 122, the electric insulating material 130 may be coated on, in addition to the end surfaces in the front-and-back direction, an inner surface 122e, an outer surface 122d, or both of the inner surface 122e and the outer surface 122d, of the front end 122a and the rear end 122b in the front-and-back direction.

For example, as shown in FIG. 1, the electric insulating material 130 may be coated on the front end 122a and the rear end 122b provided at the front and the back of the unit sheet 122. Also, as shown in FIGS. 1 and 2, among the perimeter portion of the unit sheet 122, the electric insulating material 130 may be coated on all of the end surfaces of the front end 122a and the rear end 122b in the front-and-back direction, and the inner surface 122e and outer surface 122d of the front end 122a and the rear end 122b in the front-and-back direction.

As such, according to such a configuration of the present disclosure, by coating the electric insulating material 130 on at least a part of the perimeter portion of the unit sheet 122, pouch damage of the secondary battery 110 caused by the unit sheet 122 may be prevented. In addition, the electric insulating material 130 coated on the unit sheet 122 may attach and fix the unit sheet 122 to the surface of the at least two secondary batteries 110, and thus the unit sheet 122 may maintain a state of being closely adhered to the secondary battery 110.

In addition, the electric insulating material 130 coated on the unit sheet 122 may perform, for example, a function of an adhesive to bind both ends 122f and 122g to each other while both ends 122f and 122g of the top portion of the unit sheet 122 contact each other. Accordingly, both ends 122f and 122g of the top portion of the unit sheet 122 may be bound to each other by the electric insulating material 130.

Also, when the unit sheet 122 is configured by using a metal material having excellent heat conduction, the unit sheet 122 may effectively transmit heat generated in the at least two secondary batteries 110 to the outside.

Figure 4:
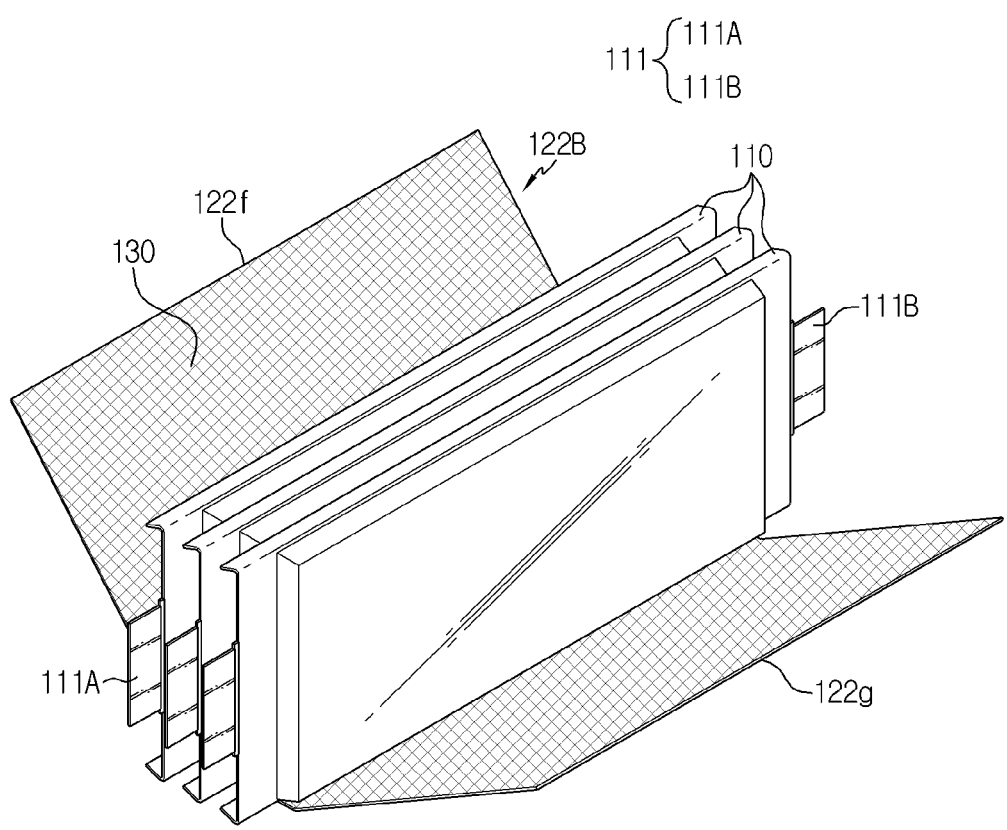
FIG. 4 is a perspective view schematically showing secondary batteries and a unit sheet before a unit body of a battery module is manufactured, according to another embodiment of the present disclosure.

FIG. 4 is a perspective view schematically showing secondary batteries and a unit sheet before a unit body of a battery module is manufactured, according to another embodiment of the present disclosure.

Referring to FIG. 4, in a unit sheet 122B according to another embodiment, the electric insulating material 130 may be additionally coated on an inner surface. In particular, the electric insulating material 130 may be coated only on an inner surface region of the unit sheet 122, which contacts the secondary battery 110. Alternatively, the electric insulating material 130 may be coated on an entire inner surface of the unit sheet 122 where the at least two secondary batteries 110 are positioned.

For example, as shown in FIG. 4, the electric insulating material 130 may be coated throughout the inner surface of the unit sheet 122 where the three secondary batteries 110 are positioned.

As such, according to such a configuration of the present disclosure, the electric insulating material 130 coated throughout the inner surface of the unit sheet 122 may prevent the secondary battery 110 from being short-circuited via the unit sheet 122 even when an inner metal layer of a pouch is externally exposed due to damage to the pouch or an exterior defect of the pouch of the secondary battery 110.

Figure 5:
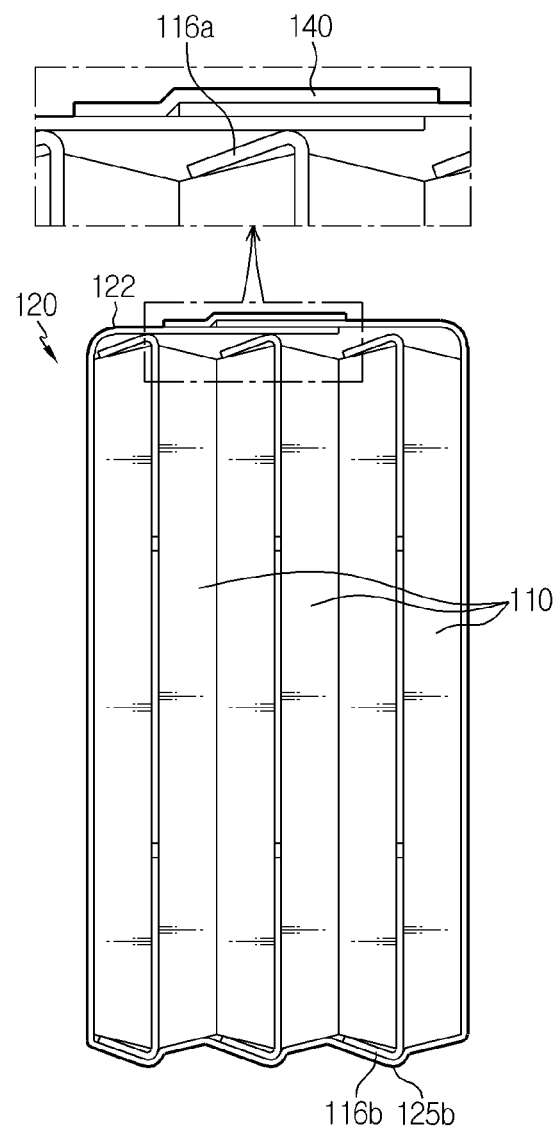
FIG. 5 is a front view schematically showing the battery module of FIG. 1.

FIG. 5 is a front view schematically showing the battery module of FIG. 1.

Referring to FIG. 5 together with FIG. 1, the unit sheet 122 may have an uneven structure 125b having a shape corresponding to the lower sealing portion 116b of the secondary battery 110. In particular, the lower sealing portion 116b of the secondary battery 110 may be positioned on a lower inner surface of the unit sheet 122.

Also, the lower sealing portion 116b of the secondary battery 110 may have a shape protruding in a downward direction, an empty space may be provided between the unit sheet 122 and the lower sealing portion 116b of the at least two secondary batteries 110, and the air may be filled in the empty space, thereby deteriorating heat radiation efficiency of the cell assembly 100.

Thus, the bottom portion of the unit sheet 122 of the present disclosure may have the uneven structure 125b having the shape corresponding to the lower sealing portion 116b of the secondary battery 110. In other words, the uneven structure 126b may include a region folded in the downward direction and a region folded in an upward direction, along an outer surface of the lower sealing portion 116b of the secondary battery 110.

For example, as shown in FIG. 5, one unit sheet 122 may have the uneven structure 125b of the shape corresponding to the lower sealing portions 116b of the three secondary batteries 110.

As such, according to such a configuration of the present disclosure, by providing the uneven structure 125b having the shape corresponding to the plurality of lower sealing portions 116b to the unit sheet 122, not only the empty space is removed from the unit sheet 122, but also a contact area between the unit sheet 122 and the secondary battery 110 is increased, thereby maximizing a heat radiation effect of the cell assembly 100.

In addition, the uneven structure 125b of the unit sheet 122 may be used to increase efficiency of manufacturing the unit body 120. In other words, the uneven structure 125b may guide the at least two secondary batteries 110 to be easily positioned at accurate positions of the unit sheet 122 to manufacture the unit body 120.

In other words, the bottom portions of the at least two secondary batteries 110 may be mounted on the uneven structure 125b of the unit sheet 122 such as to surround the at least two secondary batteries 110 by using the unit sheet 122.

Moreover, the uneven structure 125b may prevent the at least two secondary batteries 110 positioned on the unit sheet 122 from deviating from proper positions despite a small external impact while the unit body 120 is manufactured.

Also, even in the manufactured unit body 120, the uneven structure 125b may exhibit a useful effect of preventing the at least two secondary batteries 110 from moving inside the unit sheet 122 or from having a disrupted arrangement.

Figure 6:
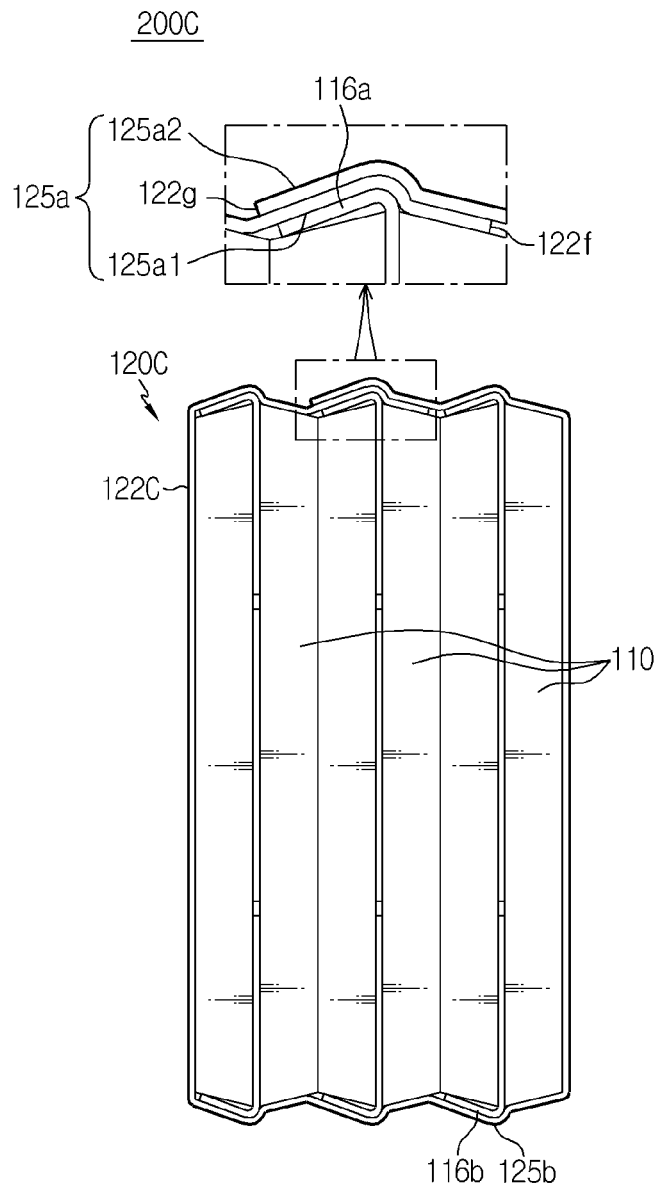
FIG. 6 is a front view schematically showing a battery module according to another embodiment of the present disclosure.

FIG. 6 is a front view schematically showing a battery module according to another embodiment of the present disclosure.

Referring to FIG. 6, the unit sheet 122 of a battery module 200C according to another embodiment may have an uneven structure 125a having a shape corresponding to the upper sealing portion 116a of the secondary battery 110.

In particular, the upper sealing portion 116a of the secondary battery 110 may have a shape protruding in an upward direction, an empty space may be provided between the upper sealing portions 116a of the at least two secondary batteries 110, and the air is filled in the empty space, thereby deteriorating heat radiation efficiency of the cell assembly 100.

Thus, the top portion of the unit sheet 122 of the present disclosure may have the uneven structure 125a of the shape corresponding to the upper sealing portion 116a of the secondary battery 110. In other words, the uneven structure 125a may include a region folded in a downward direction and a region folded in the upward direction, along the outer surface of the upper sealing portion 116a of the secondary battery 110.

For example, as shown in FIG. 6, one unit sheet 122 may have the uneven structure 125a of the shape corresponding to the upper sealing portions 116a of the three secondary batteries 110.

Also, both ends 122f and 122g of the top portion of the unit sheet 122 may be positioned on the upper sealing portion 116a of the secondary battery 110. Moreover, both ends 122f and 122g of the top portion of the unit sheet 122 may be positioned to contact each other at the top portion of the at least two secondary batteries 110.

As such, according to such a configuration of the present disclosure, the uneven structure 125a of the shape corresponding to the upper sealing portion 116a of the secondary battery 110 may be provided to the unit sheet 122, thereby increasing a heat radiation effect of the unit sheet 122.

Also, a protrusion (not shown) protruding in an outward or inward direction and an insertion hole (not shown) perforated in an up-and-down direction may be provided respectively at both ends 122f and 122g of the top portion of the unit sheet 122. In particular, an insertion hole perforated in the up-and-down direction may be provided at one end 122f of the top portion of the unit sheet 122 and a round protrusion protruding in a downward direction may be provided at the other end 122g. Accordingly, the protrusion and the insertion hole respectively provided at the one end 122f and the other end 122g of the top portion of the unit sheet 122 may be forcibly fitted and locked to each other.

As such, according to such a configuration of the present disclosure, since a unit body 120C may be forcibly fitted by using the protrusion and the insertion hole provided respectively at both ends 122f and 122g of the top portion of the unit sheet 122, the unit body 120C is easily manufactured without having to use a separate locking member, and thus manufacturing costs may be reduced and manufacturing efficiency may be increased.

Also, the unit sheet 122 may have the uneven structures 125a and 125b of shapes respectively corresponding to the upper sealing portion 116a and lower sealing portion 116b of the secondary battery 110. For example, as shown in FIG. 6, the one unit sheet 122 may have the uneven structures 125a and 125b of the shapes respectively corresponding to the upper sealing portion 116a and lower sealing portion 116b of the three secondary batteries 110.

As such, according to such a configuration of the present disclosure, since a unit sheet 122C of FIG. 6 has the uneven structures 125a and 125b at both the top and bottom portions, a heat radiation effect of the unit sheet 122C may be further increased compared to when the unit sheet 122 has the uneven structure 125b corresponding to only one of the upper sealing portion 116a and the lower sealing portion 116b as shown in FIG. 5.

Meanwhile, referring back to FIG. 5 together with FIG. 4, both ends 122f and 122g of the top portion of the unit sheet 122 positioned at the top portion of the secondary battery 110 may overlap each other. Also, an adhesive member 140 may be added to the overlapping both ends 122f and 122g of the top portion of the unit sheet 122.

As such, according to such a configuration of the present disclosure, by adding the adhesive member 140 to lock both ends 122f and 122g of the top portion of the unit sheet 122 positioned at the top portion of the secondary battery 110, the unit body 120 may be easily and strongly manufactured.

Figure 7:
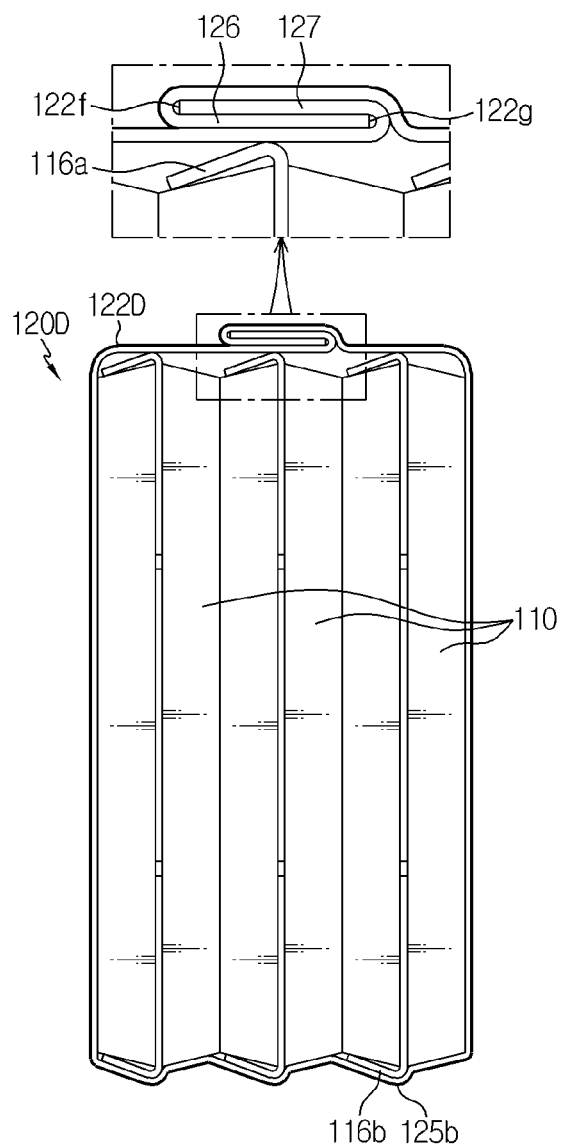
FIG. 7 is a front view schematically showing a battery module according to another embodiment of the present disclosure.

FIG. 7 is a front view schematically showing a battery module according to another embodiment of the present disclosure.

Referring to FIG. 7, a battery module 200D according to another embodiment may include an inward folded structure 126 folded in an inward direction at the one end 122f of a top portion of a unit sheet 122D in a direction surrounding the secondary battery 110. In other words, the one end 122f of the top portion of the unit sheet 122D positioned at the top of the at least two secondary batteries 110 may have the inward folded structure 126 folded in a direction where the secondary battery 110 is positioned (inward direction).

Also, the other end 122g of the top portion of the unit sheet 122D in the direction surrounding the secondary battery 110 may have an outward folded structure 127 folded in an outward direction. In other words, the other end 122g of the top portion of the unit sheet 122D positioned at the top of the at least two secondary batteries 110 may have the outward folded structure 127 folded in a direction opposite to the direction where the secondary battery 110 is positioned (outward direction).

Moreover, folded inner surfaces of the inward folded structure 126 and outward folded structure 127 of the unit sheet 122D may be positioned to face each other. In other words, the inward folded structure 126 provided at the one end 122f of the top portion of the unit sheet 122D and the outward folded structure 127 provided at the other end 122g of the top portion of the unit sheet 122D may be engaged to each other to provide a hook locking structure.

For example, as shown in FIG. 7, the inward folded structure 126 may be provided at the one end 122f of the top portion of the unit sheet 122D and the outward folded structure 127 may be provided at the other end 122g of the top portion of the unit sheet 122D. Also, the folded inner surfaces of the inward folded structure 126 and outward folded structure 127 may face each other to provide hook locking.

As such, according to such a configuration of the present disclosure, by providing the inward folded structure 126 and the outward folded structure 127 to both ends 122f and 122g of the top portion of the unit sheet 122D, both ends 122f and 122g of the top portion of the unit sheet 122D may be bound to each other without having to use a separate locking member, and thus not only manufacturing costs of the battery module 200D may be reduced, but also a unit body 120D may be manufactured in a simple structure, thereby increasing manufacturing efficiency.

Figure 8:
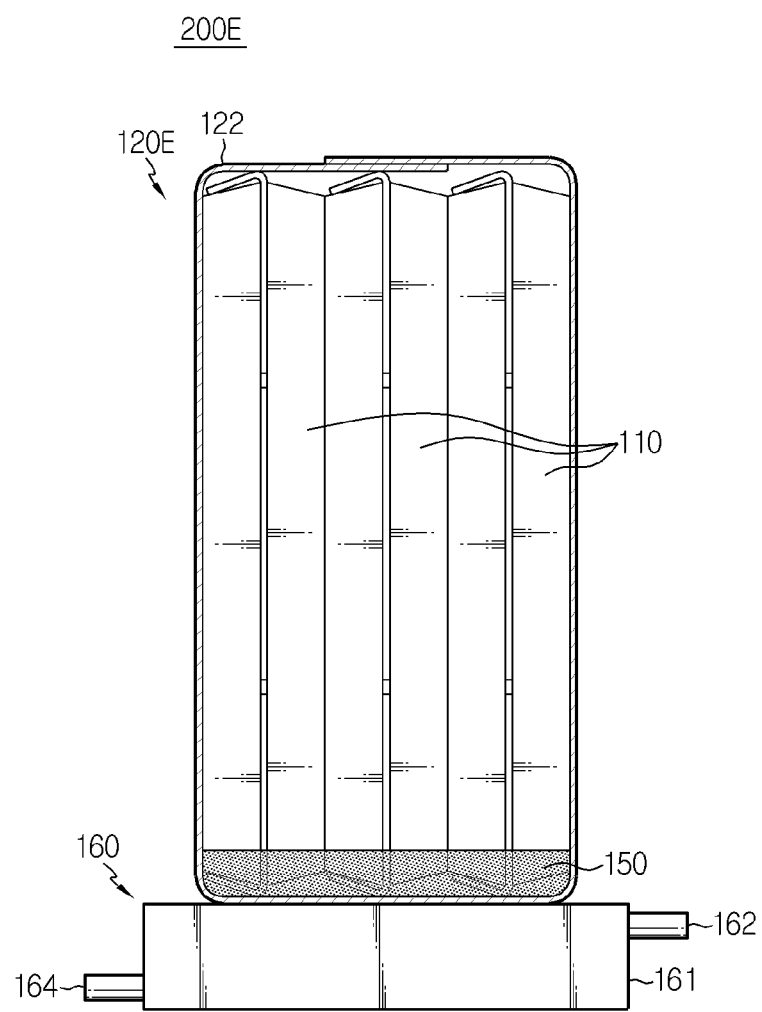
FIG. 8 is a front view schematically showing a battery module according to another embodiment of the present disclosure.

FIG. 8 is a front view schematically showing a battery module according to another embodiment of the present disclosure. However, in FIG. 8, heat conductive glue 150 that is a partial component is illustrated transparent for convenience of description.

Referring to FIG. 8, a battery module 200E may further include heat sink 160 positioned at a bottom portion of a unit body 120E. In particular, the heat sink 160 may be positioned at the bottom portion of the unit body 120E such as to absorb heat generated in the unit body 120E, i.e., to cool the plurality of secondary batteries 110.

Also, the heat sink 160 includes a chamber 161. In particular, at least one flow path (not shown) through which a refrigerant fluid is transferred therein may be provided at the chamber 161. Also, the flow path may be configured such that a cooling fluid (not shown) flows. The cooling fluid may be, for example, cooling water or air. In addition, the heat sink 160 may include an injection pipe 162 into which the cooling fluid is injected and a discharge pipe 164 from which the cooling fluid is externally discharged.

Also, the heat conductive glue 150 or a heat conductive pad (not shown) may be disposed between the unit sheet 122 and the secondary battery 110. In particular, the heat conductive glue 150 or heat conductive pad may include polymer resin or silicon-based resin having high heat conduction. For example, the polymer resin may be polysiloxane resin or epoxy-based resin.

Moreover, the heat conductive glue 150 or heat conductive pad may contact a bottom outer surface of the at least two secondary batteries 110 and a bottom inner surface of the unit sheet 122.

As such, according to such a configuration of the present disclosure, by including the heat conductive glue 150 or heat conductive pad together with the heat sink 160, the battery module of the present disclosure may further effectively discharge heat generated in the secondary battery 110 to the outside.

In particular, by positioning the heat conductive glue 150 or heat conductive pad between the unit sheet 122 positioned at the top portion of the heat sink 160 and the at least two secondary batteries 110, a structure in which internal components of the battery module 200E systematically transfer heat to the outside may be provided.

Figure 9:
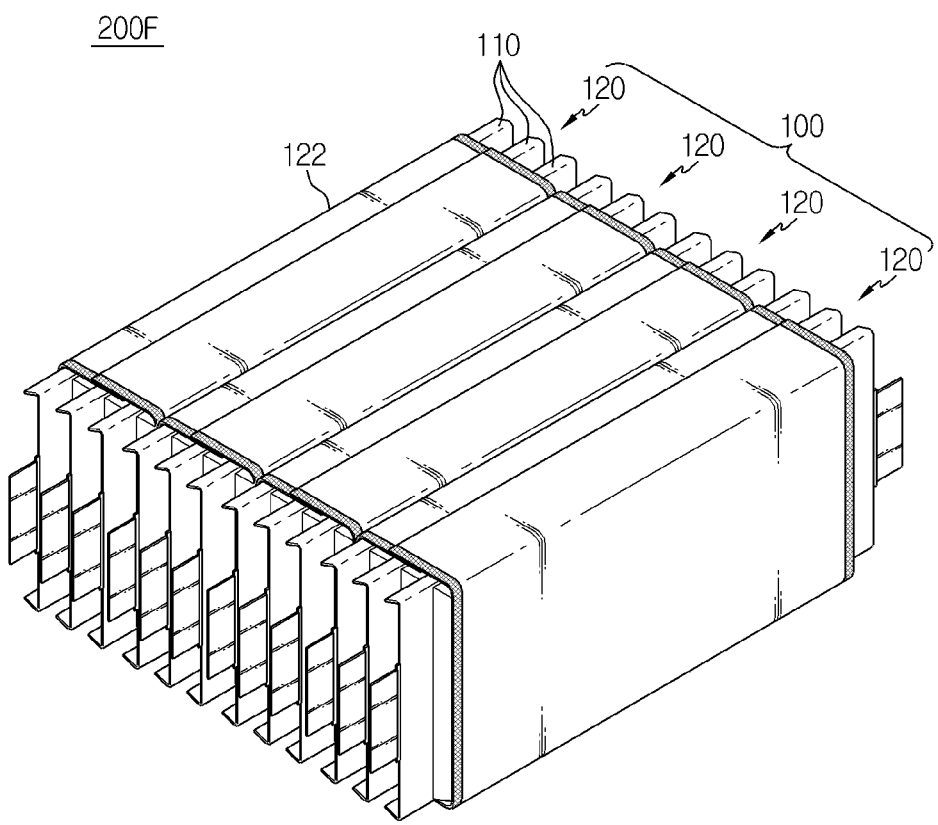
FIG. 9 is a perspective view schematically showing a battery module including a plurality of unit bodies, according to an embodiment of the present disclosure.

FIG. 9 is a perspective view schematically showing a battery module including a plurality of unit bodies, according to an embodiment of the present disclosure.

Referring to FIG. 9, the cell assembly 100 of the battery module 200F of the present disclosure may include the plurality of unit bodies 120. In particular, the plurality of unit bodies 120 may be stacked in the same direction as a stacked direction of the plurality of secondary batteries 110. In other words, the plurality of unit bodies 120 may be stacked such that the unit sheets 122 face each other.

For example, as shown in FIG. 9, the battery module 200F may include four unit bodies 120. Also, the four unit bodies 120 may be stacked such that the unit sheets 122 are closely adhered to each other.

As such, according to such a configuration of the present disclosure, the battery module 200F is configured such that the unit sheets 122 of the plurality of unit bodies 120 are adhered to each other, and thus a temperature deviation between the unit body 120 positioned at the center and the unit body 120 positioned at the edge may be effectively prevented, the temperature deviation being easily occurred when the cell assembly 100 includes the plurality of unit bodies 120. In other words, a structure in which the unit sheets 122 of the plurality of unit bodies 120 are connected to face each other quickly transfers heat generated in the unit body 120 positioned at the center to the edge, and thus heat balance of a cell assembly may be further effectively obtained.

Meanwhile, the battery module 200 of FIG. 1 of the present disclosure may further include a module housing (not shown) accommodating the cell assembly 100 and a bus bar assembly (not shown) including a plurality of bus bars (not shown) configured to electrically connect the plurality of secondary batteries 110 of the cell assembly 100 to each other. Moreover, the module housing and the bus bar assembly of the present disclosure may use components applied to a well-known battery module. Thus, hereinbelow, detailed descriptions about the module housing and the bus bar assembly are not provided.

Meanwhile, a battery pack (not shown) according to the present disclosure may include at least one battery module 200 of FIG. 1 according to the present disclosure. Also, the battery pack according to the present disclosure may further include, in addition to the battery module 200, a pack case for accommodating the battery module 200 and various devices for controlling charging and discharging of the battery module 200, such as a battery management system (BMS), a current sensor, a fuse, etc.

Also, the battery pack according to the present disclosure may be applied to means of transportation, such as a vehicle. For example, an electric vehicle according to the present disclosure may include the battery pack according to the present disclosure.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

LIST OF REFERENCE NUMERALS

| | |
|---|---|
| 200: Battery Module | 100: Cell Assembly |
| 110: Secondary Battery | 111: Electrode Lead |
| 115: Accommodating Portion | |
| 116a: Upper Sealing Portion | 116b: Lower Sealing Portion |
| 120: Unit Body | 122: Unit Sheet |
| 130: Electric Insulating Material | 125a, 125b: Uneven Structure |
| 140: Adhesive Member | 126: Inward Folded Structure |
| 127: Outward Folded Structure | 150: Heat Conductive Glue |
| 160: Heat Sink | |

What is claimed is:

1. A battery module comprising a cell assembly comprising at least one unit body, each unit body comprising:
    at least two secondary batteries stacked on each other in parallel in a left-and-right direction that is a first direction, each battery having a pouch containing an electrode assembly and having a first thickness in the first direction, the pouch having an accommodating portion containing the electrode assembly and first and second terrace portions extending outside the accommodating portion at which positive and negative leads of the respective battery extend therethrough, the first and second terrace portions being side sealing portions of the pouch having a second thickness in the first direction, the second thickness being less than the first thickness;
    an integrated unit sheet folded to surround a top portion, a left surface, a right surface, and a bottom portion of the at least two secondary batteries, opposite ends of a top portion of the integrated unit sheet being positioned to contact each other on any one of the top portion, the left surface, the right surface, and the bottom portion of the at least two secondary batteries, the integrated unit sheet having a form of a quadrangular plane sheet that is folded a plurality of times, the integrated unit sheet having opposite ends that overlap each other, the opposite ends being folded together into a hook locking structure; and
    an electric insulating material coated only on a perimeter edge portion of the integrated unit sheet, the perimeter edge portion disposed within the hook locking structure and disposed adjacent to the positive and negative leads of the at least two secondary batteries, the terrace portions of the at least two secondary batteries extending beyond the perimeter edge portion of the integrated unit sheet such that the integrated unit sheet covers an entirety of the accommodating portions without covering any portion of the terrace portions of the at least two secondary batteries.

2. The battery module of claim 1, wherein the electric insulating material is coated on an inner surface of the integrated unit sheet, the inner surface contacting the at least two secondary batteries.

3. The battery module of claim 1, wherein the integrated unit sheet is configured to surround an upper sealing portion provided at the top portion of the at least two secondary batteries, a lower sealing portion provided at the bottom portion of the at least two secondary batteries, and the accommodating portion of each of the at least two secondary batteries in which an electrolyte solution is accommodated.

4. The battery module of claim 3, wherein the integrated unit sheet has an uneven structure having a shape corresponding to either of the upper sealing portion or the lower sealing portion of the at least two secondary batteries, or both of the upper sealing portion and the lower sealing portion of the at least two secondary batteries.

5. The battery module of claim 3, wherein the lower sealing portion of the at least two secondary batteries is positioned at a lower inner surface of the unit sheet, and
    the opposite ends of the top portion of the integrated unit sheet are positioned on the upper sealing portion of the at least two secondary batteries.

6. The battery module of claim 5, wherein the integrated unit sheet has an uneven structure at each of the opposite ends of the top portion of the integrated unit sheet.

7. The battery module of claim 3, wherein each unit body includes an adhesive member disposed on an overlapping portion of the opposite ends of the top portion of the integrated unit sheet.

8. The battery module of claim 3, wherein a first one of the opposite ends of the top portion of the integrated unit sheet has a first structure folded in an inward direction, and a second one of the opposite ends of the top portion of the integrated unit sheet has a second structure folded in an outward direction.

9. The battery module of claim 1, further comprising a heat sink positioned at a bottom portion of the at least one unit body, and
    a heat conductive glue or heat conductive pad disposed between the integrated unit sheet and the at least two secondary batteries of each unit body.

10. A battery pack comprising at least one battery module according to claim 1.

11. A vehicle comprising the battery pack according to claim 10.

* * * * *